(12) United States Patent
Trapp

(10) Patent No.: US 7,322,372 B2
(45) Date of Patent: Jan. 29, 2008

(54) FIRE-FIGHTING MONITOR WITH REMOTE CONTROL

(75) Inventor: James M Trapp, Galien, MI (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 129 days.

(21) Appl. No.: 10/999,789

(22) Filed: Nov. 30, 2004

(65) Prior Publication Data

US 2006/0112994 A1 Jun. 1, 2006

(51) Int. Cl.
*G05D 16/10* (2006.01)
(52) U.S. Cl. .................... 137/12; 137/495; 137/505.28
(58) Field of Classification Search .................. 137/12, 137/14, 495 X, 505.28
See application file for complete search history.

(56) References Cited

U.S. PATENT DOCUMENTS

| | | | |
|---|---|---|---|
| 1,984,792 A | 12/1934 | Ford | |
| 3,392,749 A | 7/1968 | Gneiding et al. | |
| 3,692,047 A * | 9/1972 | Camp | 137/495 |
| 3,946,756 A * | 3/1976 | Specht | 137/495 |
| 4,008,735 A | 2/1977 | Thompson | 137/495 |
| 4,100,933 A * | 7/1978 | Davey et al. | 137/495 |
| 4,276,902 A | 7/1981 | Roth | |
| 5,358,004 A | 10/1994 | Atkinson et al. | |
| 5,662,139 A | 9/1997 | Lish | |

* cited by examiner

*Primary Examiner*—Stephen M. Hepperle
(74) *Attorney, Agent, or Firm*—Van Dyke, Gardner, Linn & Burkhart, LLP

(57) ABSTRACT

A pressure reducing valve for coupling to a pressurized water supply line includes a valve body with an inlet for coupling to the pressurized water supply line, an outlet, a passage extending between the inlet and the outlet, and a valve seat in the passage at or adjacent the inlet. A valve stem extends into the passage, which has a sealing member. An automatic pressure reducing system is provided for urging the sealing member toward the valve seat for throttling the valve to thereby reduce the pressure at the outlet. The valve also includes a manual system that is decoupled from the automatic pressure reducing system for manually urging the sealing member toward the valve seat for closing the valve.

28 Claims, 2 Drawing Sheets

FIRE-FIGHTING MONITOR WITH REMOTE CONTROL

TECHNICAL FIELD AND BACKGROUND OF THE INVENTION

The present invention relates to a pressure reducing valve that is particularly useful, for example, in a high-rise building application in a fixed fire protection system.

In high-rise buildings, the riser pipe of the fire protection system, which is typically located in a stairwell of the building, operates with a relatively high pressure in order to have a sufficient operating pressure at the highest elevation of the building. When firefighters need to access the water in these fire protection systems, for example, in the riser pipe, the pressure in the system typically exceeds the maximum pressure ratings for the fire protection components. In addition, at the lower elevations, the pressure may exceed pressure ratings for the sprinkler piping components.

In order to reduce the pressure, fire protection systems have incorporated pressure reducing valves, which reduce the pressure of the valve at intermediate elevations along the riser so that the water pressure is reduced to acceptable levels for firefighting equipment for the sprinkler piping. Prior art valves, which typically provide a handle to open or close the valve, are often hard to operate because the force exerted on the handle must exceed the spring force of a compression spring, which is used to automatically reduce the water pressure. In high-rise building applications, the compression force of these springs can be significant, for example, on the order of 1,500 pounds. In some jurisdictions, a separate upstream valve may be required because the valves are so hard to use.

Consequently, there is a need for a pressure reducing valve that is easier to operate to provide access to lower pressure water in a high-rise fire protection system, without comprising the function of the pressure reducing valve.

SUMMARY OF THE INVENTION

The present invention relates to a pressure reducing valve that decouples the automatic pressure reducing function of the valve from the manual operation of the valve.

In one form of the invention, a pressure reducing valve for coupling to a pressurized water supply line includes a valve body with an inlet for coupling to the pressurized water supply line, an outlet, a passage extending between the inlet and the outlet, and a valve seat in the passage at or adjacent the inlet. A valve stem extends into the passage, which has a sealing member. An automatic pressure reducing system is provided for urging the sealing member toward the valve seat for throttling the valve to thereby reduce the pressure at the outlet. The valve also includes a manual system that is decoupled from the automatic pressure reducing system for manually urging the sealing member toward the valve seat for closing the valve.

In one aspect, the automatic pressure reducing system includes a piston mounted to the valve stem. The valve is configured so that the water pressure at the inlet is directed to a chamber in the valve where the piston is located to apply pressure on the piston. The pressure on the piston applies a load on the valve stem to urge the sealing member toward the valve seat to thereby automatically adjust the pressure at the outlet.

In a further aspect, the manual system is decoupled from the pressure on the piston.

In yet another aspect, the valve further includes a spring, which is coupled to the valve stem and generates a spring force opposed to the pressure on the piston to adjust the load on the valve stem and to thereby adjust the pressure at the outlet. The manual system is decoupled from the pressure on the piston and also from the spring force of the spring to facilitate closing of the valve.

In a further aspect, the manual system includes a hand operable member, which is coupled to the valve stem and is movable to urge the sealing member toward the valve seat but with the movement of the hand operable member decoupled from the pressure on the piston and the spring force of the spring. In one form, the valve stem may include a first valve stem portion, which coupled to the piston and the spring, and a second valve stem portion, which coupled to the hand operable member. In addition, the second valve stem portion may be guided by the first valve stem portion and movable relative to the first valve stem portion. For example, the first valve stem portion may comprises an outer valve stem portion, with the second valve stem portion comprising an inner valve stem portion guided in the outer valve stem portion.

According to another form of the invention, a pressure reducing valve for coupling to a pressurized water supply line includes a valve body with an inlet for coupling to the pressurized water supply line, an outlet, a passage extending between the inlet and the outlet, and a valve seat in the passage at or adjacent the inlet. The valve also includes a valve stem that extends into the passage, which has a first valve stem portion, a second valve stem portion, and a sealing member coupled to the first valve stem portion and the second valve stem portion. The second valve stem portion is movable with respect to the first valve stem portion. An automatic pressure reducing system is provided for urging the first valve stem portion and the sealing member toward the valve seat for throttling the valve to thereby automatically reduce the pressure at the outlet. The valve also includes a manual system that is decoupled from the automatic pressure reducing system for manually urging the second valve stem portion and the sealing member toward the valve seat for closing the valve independent of the first valve stem portion.

In one aspect, the automatic pressure reducing system includes a piston mounted to the first valve stem portion. The water pressure at the inlet is directed to the chamber where the piston is located and applies pressure on the piston to apply a load on the first valve stem portion to urge the sealing member toward the valve seat to adjust the pressure at the outlet. In a further aspect, the valve includes a spring that is coupled to the first valve stem portion and generates a spring force opposed to the pressure on the piston to adjust the load on the first valve stem portion and to thereby adjust the pressure at the outlet. The manual system is decoupled from the pressure on the piston and the spring force of the spring to facilitate closing of the valve.

For example, the manual system may include a hand operable member that is selectively coupled to the second valve stem portion and is movable to urge the second valve stem portion and the sealing member toward the valve seat, and wherein movement of the hand operable member is decoupled from the pressure on the piston and the spring force of the spring.

In another form of the invention, a pressure reducing valve for coupling to a pressurized water supply line includes a valve body with an inlet for coupling to the pressurized water supply line, an outlet, a passage extending between the inlet and the outlet, and a valve seat in the passage at or adjacent the inlet. A housing is mounted to the valve body and includes a chamber. The valve also includes a valve stem that extends through the chamber and into the passage, which has a sealing member for sealing the valve seat and a piston, which is located in the chamber. The valve stem also includes a passageway in communication with the passage and the chamber wherein water at the inlet flows through the passageway into the chamber and exerts pressure on the piston wherein the piston applies an urging force to the valve stem to urge the sealing member of the valve stem toward the valve seat to thereby restrict the flow of water through the inlet and thereby reduce the pressure at the outlet. A spring applies a biasing force against the pressure exerted on the piston to thereby adjust the urging force of the piston on the valve stem. In addition, the valve includes a hand operable member that selectively moves the valve stem to manually urge the sealing member of the valve stem to seal against the valve seat, wherein the hand operable member is decoupled from the biasing force of the spring and the urging force of the piston to facilitate closing of the valve.

In one aspect, the valve stem includes a first valve stem portion coupled to the spring, the piston, and the sealing member. The valve stem further including a second valve stem portion coupled to the sealing member and the hand operable member, which is decoupled from the spring and the piston wherein the hand operable member is operable to move the sealing member to seal the valve seat to thereby close the valve independent from the spring and the piston. For example, the first valve stem portion may comprise an outer valve stem portion, with the second valve stem portion comprising an inner valve stem portion guided in the outer valve stem portion.

According to yet another form of the invention, a method of closing a pressure reducing valve, which includes a valve body, a valve stem with a sealing member, an automatic pressure reducing system for urging the sealing member toward the valve seat for throttling the valve to thereby reduce the pressure at the outlet, and a manual system for manually urging the sealing member toward the valve seat, includes decoupling the manual system from the automatic pressure reducing system wherein the force needed to manually urge the sealing member toward the valve seat for closing the valve is independent from the forces generated by the automatic pressure reducing system that urge the sealing member toward the valve seat to throttle the valve.

In one form, the manual system is provided with a handle that is selectively engageable with the valve stem.

In another form, the manual system is decoupled from the automatic pressure reducing system by providing a valve stem with a first valve stem portion and a second valve stem portion and coupling the first valve stem portion with the automatic pressure reducing system while coupling the second valve stem portion with the manual system.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 2:
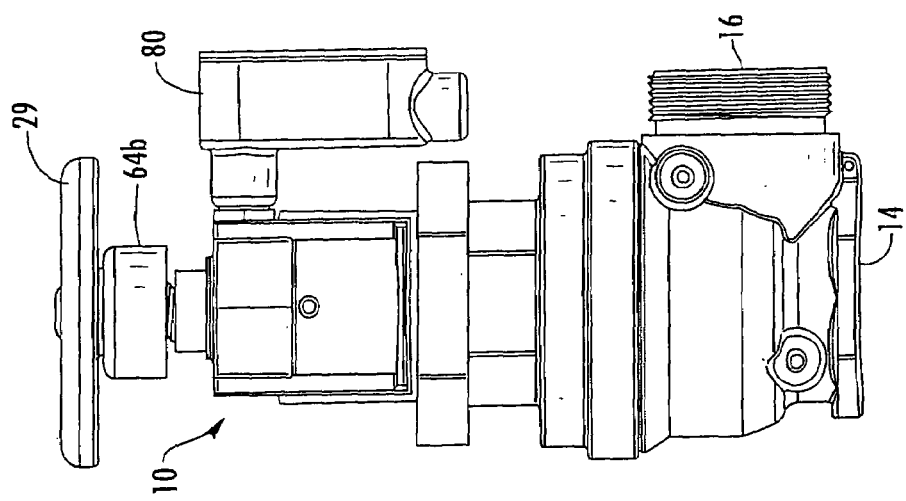
FIG. 2 is a side view of the pressure reducing valve of FIG. 1.
Figure 1:
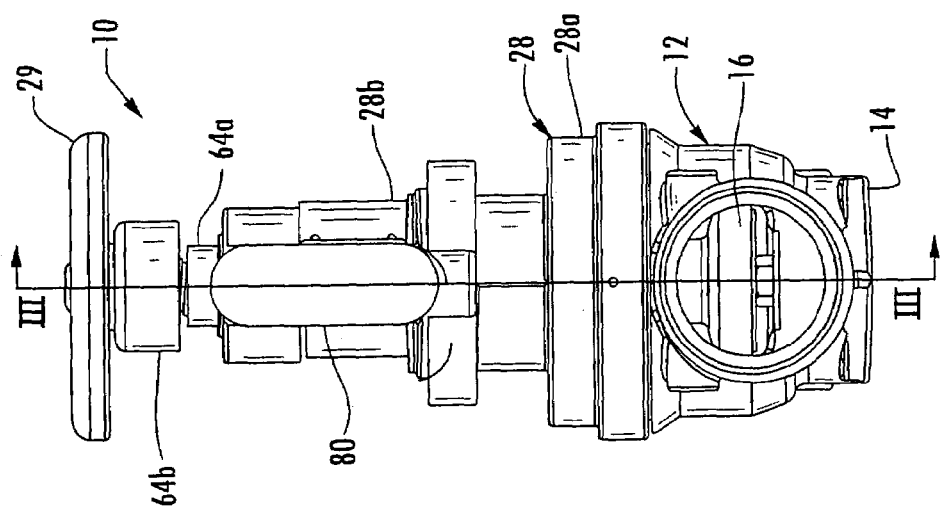
FIG. 1 is an elevation view of the pressure reducing valve of the present invention.

Referring to FIG. 1, the numeral 10 generally designates a pressure reducing valve of the present invention. Pressure reducing valve 10 is adapted to reduce the pressure in a pipe that is subject to high pressures, for example a riser pipe in a fire protection system where the water pressure is high in order to deliver water at higher elevations at a suitable operating pressure. As will be more fully described below, valve 10 is configured to facilitate opening of the valve and may be coupled to a fire hose or to the sprinkler piping.

Figure 3:
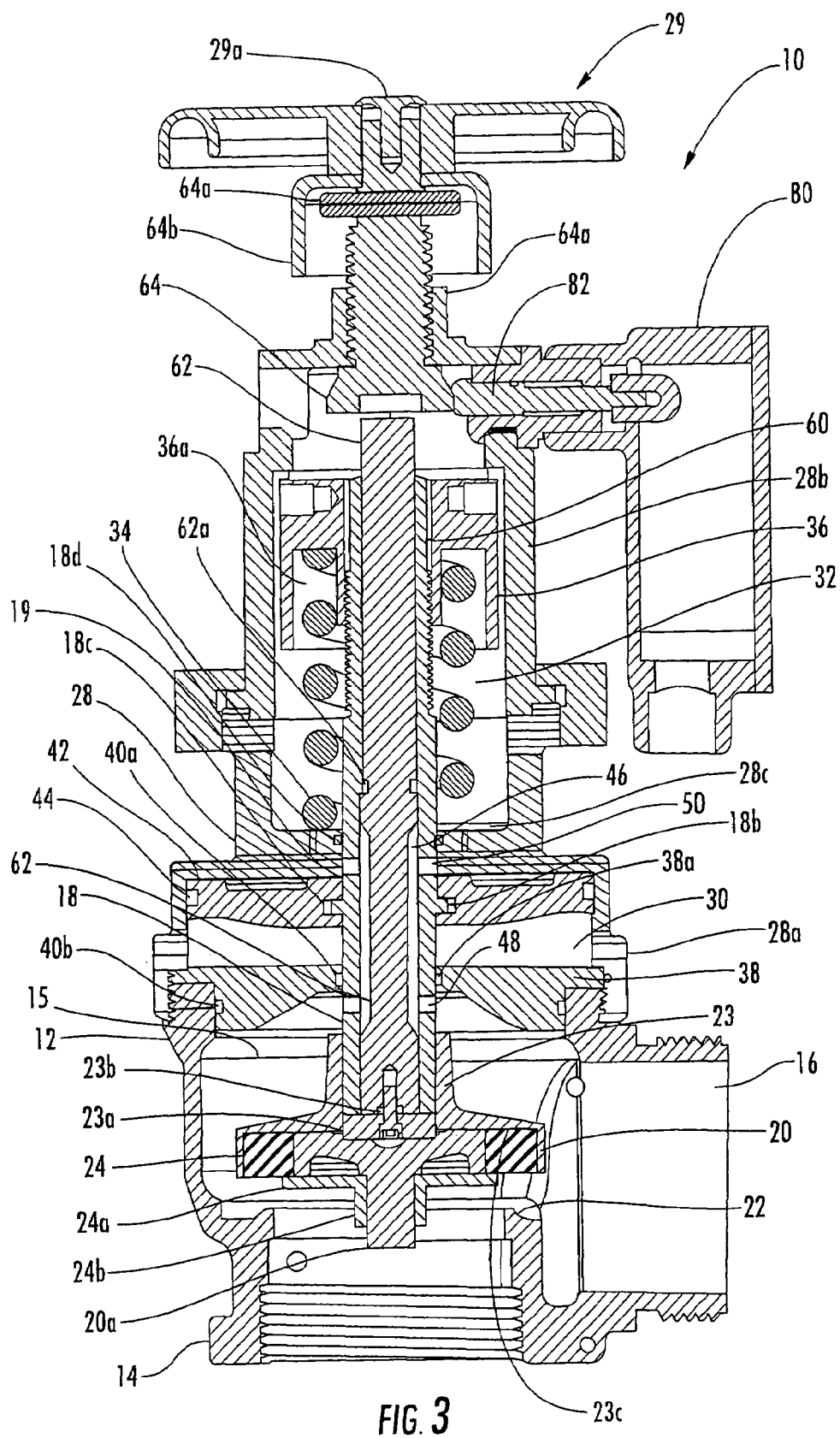
FIG. 3 is a cross-section view taken along line III-III of FIG. 2.

As best seen in FIG. 3, valve 10 includes a valve body 12 with an inlet 14 and an outlet 16, which are in selective communication by way of a passageway 15 that extends through body 12. In the illustrated embodiment, inlet 14 is internally threaded for coupling to a pipe, such as a water supply pipe of a fire protection system, while outlet 16 is externally threaded for coupling to a fire hose or may be internally threaded for coupling to a pipe, such as sprinkler piping. Positioned in body 12 and in passageway 15 is a valve stem 18 and a valve member 20, which is mounted to the distal end of valve stem 18 and aligned over a valve seat 22 formed or otherwise provided in body 12. As will be more fully described below, valve 10 includes an automatic pressure reducing system and also a manual system for opening or closing the valve, which is decoupled from the automatic pressure reducing system.

Valve member 20 includes an annular body 23, which is mounted to the distal end of valve stem 18 by a push rod guide 23a and a fastener 23b, and a gasket 24, such as an annular rubber gasket, for selectively sealing inlet 14 when valve stem 18 urges valve member 20 to seal against seat 22. Gasket 24 is mounted in annular body 23 in an annular groove 23c by a washer 24a and a nut 24b, which are mounted on stem 20a of valve member 20.

Valve stem 18 extends from body 12 and into housing 28 for coupling to a hand wheel 29, described more fully below. Housing 28 includes a lower portion 28a, which defines a chamber 30, and an upper portion 28b, which includes a passageway 32 and houses valve stem 18, a spring 34, and an adjustment member 36, more fully described below. In the illustrated embodiment, lower portion 28a of housing 28, which forms cavity or chamber 30, is threaded onto body 12. Positioned between lower portion 28a of housing 28 and body 12 is an annular member 38, which separates passage 15 from chamber 30 and provides a guide for valve stem 18 into body 12. To seal opening 38a, a seal 40a, such as an O-ring seal, is mounted in member 38 at opening 38a. A second seal 40b is provided in member 38 at its interface with body 12.

Positioned in chamber 30 and secured to valve stem 18 is a piston 42, which includes an annular seal 44 at its perimeter, such as an O-seal, and is coupled to stem 18 by an annular shoulder 18b formed or otherwise provided on stem 18 and retaining ring 19, In addition, stem 18 includes an annular seal 18c to seal piston 42 against stem 18 and seal 18d for sealing stem 18 in the bottom wall of upper housing 28b. Piston 42 and, hence, stem 18 are movable so that piston 42 moves between an upper position (shown in FIG. 3) and a lower position in which piston 42 is adjacent annular member 38 and valve stem 18 is urged downward to seal valve member 20 against seat 22. The position of piston 42 is controlled by the pressure of fluid flowing into inlet 14, which is directed past valve member 20 and directed into cavity 30 above piston 42 through valve stem 18, and by spring 34, which varies the load on the piston to adjust the pressure at outlet 16. As will understood by those skilled in the art, the position of valve stem 18 and, hence, valve member 20 is controlled at least in part by the pressure from the water entering inlet 14 that is directed above piston 42, which tends to close the valve and, therefore, throttles the valve. Spring 34, however, varies the load on the piston to adjust the pressure at outlet 16.

As noted above, the inlet pressure is directed into chamber 30 above piston 42 by valve stem 18. In the illustrated embodiment, valve stem 18 includes a passageway 46, which is in fluid communication with passageway 15 by way of opening 48 and in fluid communication with chamber 30 above piston 42 by way of opening 50. In this manner, when inlet 14 is opened, water will flow into chamber 15 and into valve stem 18 and then into chamber 30 above piston 42. This water pressure then urges piston 42 downward (as viewed in FIG. 3) and tends to throttle or close the valve. However, as noted above, spring 34, which extends into cavity 36a of adjustment member 36 is compressed between adjustment member 36 and lower end 28c of upper portion 28b of housing 28. Spring 34 adjusts the load on piston 42 to increase or decrease the pressure effect on the piston. To adjust the effect of the spring, adjustment member 36 is threaded onto valve stem 18 and, therefore, may be turned about stem 18 to vary the compression on spring 34 and, hence, adjust the load on the piston. Hence, the spring and the piston provide an automatic pressure reducing system.

In order to decouple this automatic pressure reducing function of the piston and the spring, valve stem 18 of the present invention includes two stem portions—an outer stem member 60 and an inner stem member 62, which is guided by outer stem member 60 and sealed against the inner surface of member 60 by a seal 62a. Adjustment member 36, as noted above, is threaded onto stem 18 but at outer stem member 60 so that outer stem member 60 is coupled to the automatic pressure reducing system of valve 10.

In contrast, inner stem member 62, which is guided in outer stem member 60, is decoupled from the spring, the adjustment member, and also the piston but coupled at its distal end to valve member 20. But inner stem member 62 is selectively coupled to handle 29 by handle stem 64, which is in threaded engagement with upper portion 28b of housing 28. Handle 29, which preferably comprises a hand wheel, is mounted to handle stem 64 by a fastener 29a so that when handle 29 is rotated, stem 64 is urged into or out of housing 28. To limit the movement of stem 64 into housing, stem 64 includes a transverse pin 64a, which provides a stop. In addition, stem 64 may include a cup-shaped sleeve 64b, which also forms a stop to indicate when valve stem 64 is fully inserted into housing 28. When stem 64 is extended into housing 28, stem 64 contacts and urges inner valve stem portion 62 toward valve seat 22. The lower end of inner valve stem portion 62 is coupled to valve member 20 so that when valve stem portion 62 is pushed downward as viewed in FIG. 3, valve member 20 is urged toward valve seat 22. In this manner, when handle 29 is rotated, inner stem member 62 can be manually urged downward (as viewed in FIG. 3) to urge valve member 20 against seat 22 without having to overcome the compression forces of spring 34 or the pressure on piston 42.

In addition, valve 10 may include a supervisory switch 80, which includes a plunger or actuator 82 that contacts stem 64 of handle 29 to detect when the valve is open or closed. Stem 64 includes a cam surface, which compresses plunger 82 when stem 64 is in its retracted position, which indicates valve 10 is open. When handle 29 is rotated and stem 64 is extended into housing 28, plunger 82 rides on the cam surface, which allows plunger 82 to extend, which indicates valve 10 is closed.

Accordingly, the present invention provides a pressure reducing valve 10 that includes an automatic pressure reducing system but with a manual adjustment feature that permits the manual adjustment feature to adjust the position of the valve independently from the automatic pressure reducing system to facilitate manual opening or closing of the valve.

The embodiments of the invention in which an exclusive property right or privilege is claimed are defined as follows:

1. A pressure reducing valve for coupling to a pressurized water supply line, said valve comprising:
   a valve body with an inlet for coupling to the pressurized water supply line, an outlet, and a passage extending between said inlet and said outlet, said valve body having a valve seat in said passage at or adjacent said inlet;
   a valve stem extending into said passage, said valve stem having a sealing member and having first and second valve stem portions coupled to said sealing member;
   an automatic pressure reducing system for urging said sealing member toward said valve seat for throttling said valve to thereby reduce the pressure at said outlet, wherein said automatic pressure reducing system comprises a piston mounted to said first valve stem portion; and
   a manual system coupled to said second valve stem portion for urging said sealing member toward said valve seat, said manual system being decoupled from said automatic pressure reducing system such that said second valve stem portion and said sealing member are adapted to move with respect to said first valve stem portion and said piston.

2. The pressure reducing valve according to claim 1, said valve further comprising a chamber, the water pressure at said inlet being directed to said chamber and applying pressure on said piston to apply a load on said valve stem to urge said sealing member toward said valve seat to adjust the pressure at said outlet.

3. The pressure reducing valve according to claim 2, wherein said manual system is decoupled from said pressure on said piston.

4. The pressure reducing valve according to claim 2, further comprising a spring, said spring coupled to said first valve stem portion and generating a spring force opposed to said pressure on said piston to adjust the load on said valve stem and to thereby adjust the pressure at said outlet.

5. The pressure reducing valve according to claim 4, wherein said manual system is decoupled from said pressure on said piston and said spring force of said spring to facilitate closing of the valve, wherein said manual system can urge said sealing member toward said valve seat without having to overcome said spring force or said pressure on said piston.

6. The pressure reducing valve according to claim 4, wherein said manual system includes a hand operable member, said hand operable member coupled to said second valve stem portion and being movable to urge said sealing member toward said valve seat, and wherein movement of said hand operable member is decoupled from said pressure on said piston and said spring force of said spring.

7. A pressure reducing valve for coupling to a pressurized water supply line, said valve comprising:
   a valve body with an inlet for coupling to the pressurized water supply line, an outlet, and a passage extending between said inlet and said outlet, said valve body having a valve seat in said passage at or adjacent said inlet;

a valve stem extending into said passage, said valve stem having a sealing member;

an automatic pressure reducing system for urging said scaling member toward said valve seat for throttling said valve to thereby reduce the pressure at said outlet, wherein said automatic pressure reducing system comprises a piston mounted to said valve stem: and a manual system coupled to said scaling member for urging said sealing member toward said valve seat, said manual system being decoupled from said automatic pressure reducing system such that said manual system can urge said sealing member toward said valve seat without having to overcome said pressure on said piston;

said valve further comprising a chamber, the water pressure at said inlet being directed to said chamber and applying pressure on said piston to apply a load on said valve stem to urge said sealing member toward said valve seat to adjust the pressure at said outlet;

further comprising a spring, said spring coupled to said valve stem and generating a spring force opposed to said pressure on said piston to adjust the load on said valve stem and to thereby adjust the pressure at said outlet;

wherein said manual system includes a hand operable member, said hand operable member coupled to said valve stem and being movable to urge said sealing member toward said valve seat, and wherein movement of said hand operable member is decoupled from said pressure on said piston and said spring force of said spring;

wherein said valve stem includes a first valve stem portion coupled to said piston and said spring, said valve stem including a second valve stem portion coupled to said hand operable member; and wherein said second valve stem portion is guided by said first valve stem portion and movable relative to said first valve stem portion.

8. The pressure reducing valve according to claim 7, wherein said first valve stem portion comprises an outer valve stem portion, said second valve stem portion comprising an inner valve stem portion guided in said outer valve stem portion.

9. The pressure reducing valve according to claim 4, wherein said spring comprises a coil spring.

10. The pressure reducing valve according to claim 6, wherein said hand operable member comprises a rotatable handwheel.

11. A pressure reducing valve for coupling to a pressurized water supply line, said valve comprising:

a valve body with an inlet for coupling to the pressurized water supply line, an outlet, and a passage extending between said inlet and said outlet, said valve body having a valve seat in said passage at or adjacent said inlet;

a valve stem extending into said passage, said valve stem having a first valve stem portion, a second valve stem portion, and a sealing member coupled to said first valve stem portion and second valve stem portion, and said second valve stem portion movable with respect to said first valve stern portion;

an automatic pressure reducing system for urging said first valve stem portion and said sealing member toward said valve seat for throttling said valve to thereby reduce the pressure at said outlet;

a manual system decoupled from said automatic pressure reducing system for manually urging said second valve stem portion and said sealing member toward said valve seat for closing said valve, wherein said second valve stem portion is movable relative to said first valve stem portion; and wherein said first valve stem portion comprises an outer valve stem portion, said second valve stem portion comprising an inner valve stem portion guided entirely in said outer valve stem portion.

12. The pressure reducing valve according to claim 11, wherein said automatic pressure reducing system comprises a piston mounted to said first valve stem portion, said valve further comprising a chamber, the water pressure at said inlet being directed to said chamber and applying pressure on said piston to apply a load on said first valve stem portion to urge said sealing member toward said valve seat to adjust the pressure at said outlet.

13. The pressure reducing valve according to claim 12, further comprising a spring, said spring coupled to said first valve stem portion and generating a spring force opposed to said pressure on said piston to adjust the load on said first valve stem portion and to thereby adjust the pressure at said outlet.

14. The pressure reducing valve according to claim 13, wherein said manual system is decoupled from said pressure on said piston and said spring force of said spring.

15. The pressure reducing valve according to claim 14, wherein said manual system includes a hand operable member, said hand operable member being selectively coupled to said second valve stem portion and being movable to urge said second valve stem portion and said sealing member toward said valve seat, and wherein movement of said band operable member is decoupled from said pressure on said piston and said spring force of said spring.

16. A pressure reducing valve for coupling to a pressurized water supply line, said valve comprising:

a valve body with an inlet for coupling to a pressurized water supply line, an outlet, and a passage extending between said inlet and said outlet, said valve body having a valve seat in said passage at or adjacent said inlet;

a housing mounted to said valve body, said housing including a chamber;

a valve stem extending through said chamber and into said passage, said valve stem having first and second valve stem portions coupled to a sealing member for sealing said valve seat;

a piston mounted to said first valve stem portion and located in said chamber, and said valve stem having a passageway in communication with said passage and said chamber, wherein water flows through said passageway into said chamber and exerts pressure on said piston wherein said piston applies an urging force to said first valve stem portion to urge said sealing member toward said valve seat to thereby restrict the flow of water through said inlet;

a spring coupled to said first valve stem portion for applying a biasing force against the pressure exerted on said piston to thereby adjust the urging force of said piston on said first valve stem portion;

a hand operable member coupled to said second valve stem portion for selectively moving said second valve stem portion to manually urge said sealing member to seal against said valve seat to thereby close the valve, and wherein said hand operable member is decoupled from the biasing force of said spring and said urging force of said piston to facilitate the closing of the valve, wherein said second valve stem portion and said sealing member are adapted to move with respect to said first valve stem portion and said piston.

17. The pressure reducing valve according to claim 16, wherein said first valve stem portion comprises an outer valve stem portion, said second valve stem portion comprising an inner valve stem portion guided in said outer valve stem portion.

18. The pressure reducing valve according to claim 16, wherein said spring is mounted outside said first valve stem portion in said housing.

19. The pressure reducing valve according to claim 18, wherein said piston is coupled to said first valve stem portion in said chamber.

20. A pressure reducing valve for coupling to a pressurized water supply line, said valve comprising:
   a valve body with an inlet for coupling to the pressurized water supply line, an outlet, and a passage extending between said inlet and said outlet, said valve body having a valve seat in said passage at or adjacent said inlet;
   a housing mounted to said valve body, said housing including a chamber;
   a valve stem extending through said chamber and into said passage, said valve stem having a sealing member for sealing said valve seat;
   said valve stem including a piston, said piston located in said chamber, and said valve stem having a passageway in communication with said passage and said chamber, wherein water flows through said passageway into said chamber and exerts pressure on said piston wherein said piston applies an urging force to said valve stem to urge said sealing member of said valve stem toward said valve seat to thereby restrict the flow of water through said inlet;
   a spring applying a biasing force against the pressure exerted on said piston to thereby adjust the urging force of said piston on said valve stem;
   a hand operable member selectively moving said valve stem to manually urge said sealing member of said valve stem to seal against said valve seat to thereby close the valve, and wherein said hand operable member is decoupled from the biasing force of said spring and said urging force of said piston to facilitate the closing of the valve;
   wherein said valve stem includes a first valve stem portion coupled to said spring, said piston, and said sealing member, said valve stem further including a second valve stem portion coupled to said sealing member and said hand operable member and decoupled from said spring and said piston wherein said hand operable member is operable to move said sealing member to seal said valve seat to thereby close said valve independent from said spring and said piston; and
   wherein said hand operable member comprises a handwheel, said handwheel selectively engageable with said second valve stem portion to thereby manually move said second valve stem portion.

21. A method of closing a pressure reducing valve, the valve having a valve body with an inlet for coupling to a pressurized water supply line, an outlet, and a passage extending between the inlet and the outlet, the valve body having a valve seat at or adjacent the inlet, the valve further having a valve stem extending into the passage, the valve stem having a sealing member, and the valve including an automatic pressure reducing system for urging the sealing member toward the valve seat for throttling the valve to thereby reduce the pressure at the outlet, wherein the automatic pressure reducing system comprises a piston mounted to the valve stem, said method comprising:
   providing the valve stem with a first valve stem portion coupled to the piston and a second valve stem portion coupled to the sealing member, wherein the second valve stem portion and the sealing member are movable with respect to the first valve stem portion and the piston;
   providing a manual system for manually urging the sealing member toward the valve seat, the manual system being selectively coupled to the second valve stem portion; and
   decoupling the manual system from the automatic pressure reducing system wherein the force needed to manually urge the second valve stem portion and the sealing member toward the valve seat for closing the valve is independent from the forces generated by the automatic pressure reducing system that urge the sealing member toward the valve seat, wherein the manual system can urge the second valve stem portion and the sealing member toward the valve seat without having to overcome pressure from the piston.

22. The method according to claim 21, wherein said providing a manual system includes providing a handle that is selectively engageable with the valve stem.

23. The method according to claim 22, wherein said providing a valve stem with a first valve stem portion and a second valve stem portion includes providing an outer valve stem portion coupled to the sealing member and to the automatic pressure reducing system arid providing an inner valve stem portion in the outer valve stem portion that is coupled to the sealing member and the manual system.

24. A method of closing a pressure reducing valve, the valve having a valve body with an inlet for coupling to a pressurized water supply line, an outlet, and a passage extending between the inlet and the outlet, the valve body having a valve seat at or adjacent the inlet, the valve further having a valve stem extending into the passage, the valve stem having a sealing member, and the valve including an automatic pressure reducing system for urging the sealing member toward the valve seat for throttling the valve to thereby reduce the pressure at the outlet, wherein said automatic pressure reducing system comprises a piston mounted to the valve stem, said method comprising:
   providing a manual system for manually urging the sealing member toward the valve seat; and
   decoupling the manual system from the automatic pressure reducing system wherein the force needed to manually urge the sealing member toward the valve seat for closing the valve is independent from the forces generated by the automatic pressure reducing system that urge the sealing member toward the valve seat, wherein the manual system can urge the sealing member toward the valve seat without having to overcome pressure from the piston;
   wherein said decoupling includes providing the valve stem with a first valve stem portion and a second valve stem portion movable with respect to the first valve stem portion, coupling the first valve stem portion with the automatic pressure reducing system, and coupling the second valve stem portion with the manual system;
   wherein said providing the valve stem with a first valve stem portion and a second valve stem portion includes providing the valve stem with an outer valve stem portion coupled to the sealing member and to the automatic pressure reducing system and providing the valve stem with an inner valve stem portion that is coupled to the sealing member and the manual system, the inner valve stem portion being guided in the outer valve stem portion; and wherein providing a manual system includes providing a handle, said handle selectively coupled to said inner valve stem portion.

25. The pressure reducing valve according to claim 20, wherein said first valve stem portion comprises an outer valve stem portion, said second valve stem portion comprising an inner valve stem portion guided in said outer valve stem portion.

26. The pressure reducing valve according to claim 25, wherein said spring is mounted outside said first valve stem portion in said housing.

27. The method according to claim 24, further comprising providing a spring coupled to the first valve stem portion for applying a biasing force against the pressure exerted on the piston.

28. The method according to claim 27, further comprising selectively turning said handle to urge the inner valve stem portion and the sealing member toward the valve seat to thereby close the valve, wherein the handle is decoupled from the biasing force of the spring and the urging force of the piston.

* * * * *

UNITED STATES PATENT AND TRADEMARK OFFICE
CERTIFICATE OF CORRECTION

PATENT NO. : 7,322,372 B2 Page 1 of 1
APPLICATION NO. : 10/999789
DATED : January 29, 2008
INVENTOR(S) : James M. Trapp It is certified that error appears in the above-identified patent and that said Letters Patent is hereby corrected as shown below:

On the Title Page
Item (54) In The Header: and in col. 1, lines 1-2,
"FIRE-FIGHTING MONITOR WITH REMOTE CONTROL" should be
--PRESSURE REDUCING VALVE--.

Column 4:
Line 56, "," should be --.-- after "19".

Column 6:
Line 24, Claim 1, "scaling" should be --sealing--.
Line 54, Claim 5, "scaling" should be --sealing--.

Column 7:
Line 7, Claim 7, "scaling" should be --sealing--.
Line 10, Claim 7, ":" should be --;-- after "stem".
Line 11, Claim 7, "scaling" should be --sealing--.
Line 65, Claim 11, "stern" should be --stem--.

Column 8:
Line 35, Claim 15, "band" should be --hand--.
Line 40, Claim 16, "a" should be --the-- before "pressurized".

Column 10:
Line 34, Claim 23, "arid" should be --and--.

Signed and Sealed this

Thirteenth Day of May, 2008

JON W. DUDAS
*Director of the United States Patent and Trademark Office*